(12) United States Patent
Birk et al.

(10) Patent No.: US 10,056,971 B2
(45) Date of Patent: *Aug. 21, 2018

(54) FAST OPTICAL LINK CONTROL ADAPTATION USING A CHANNEL MONITOR

(71) Applicant: AT&T Intellectual Property I, L.P., Atlanta, GA (US)

(72) Inventors: Martin Birk, Holmdel, NJ (US); Mark David Feuer, Colts Neck, NJ (US); Kathleen A. Tse, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 23 days.

This patent is subject to a terminal disclaimer.

(21) Appl. No.: 15/049,516

(22) Filed: Feb. 22, 2016

(65) Prior Publication Data

US 2016/0173191 A1    Jun. 16, 2016

Related U.S. Application Data

(63) Continuation of application No. 13/675,454, filed on Nov. 13, 2012, now Pat. No. 9,300,396.

(51) Int. Cl.
*H04B 10/293* (2013.01)
*H04B 10/077* (2013.01)
*H04B 10/03* (2013.01)

(52) U.S. Cl.
CPC ......... *H04B 10/03* (2013.01); *H04B 10/0777* (2013.01)

(58) Field of Classification Search
CPC .................................................. H04B 10/0777
See application file for complete search history.

(56) References Cited

U.S. PATENT DOCUMENTS

| | | | | |
|---|---|---|---|---|
| 5,900,969 | A * | 5/1999 | Srivastava | H04B 10/291 359/337 |
| 6,624,926 | B1 * | 9/2003 | Hayashi | H01S 3/1301 359/334 |
| 6,952,309 | B1 | 10/2005 | Tsuzaki et al. | |
| 7,512,342 | B1 | 3/2009 | Feuer et al. | |
| 7,580,632 | B1 | 8/2009 | Feuer et al. | |
| 7,630,636 | B1 | 12/2009 | Feuer et al. | |
| 7,925,160 | B2 | 4/2011 | Feuer et al. | |
| 8,019,222 | B2 | 9/2011 | Feuer et al. | |

(Continued)

OTHER PUBLICATIONS

Mark D. Feuer and Vinay A. Vaishampayan, "In-Band Management Channel for Lightpaths in Photonic Networks", European Conference on Optical Communications—ECOC2004, 2004, 2 pages.

(Continued)

*Primary Examiner* — Shi K Li
(74) *Attorney, Agent, or Firm* — Chiesa Shahinian & Giantomasi PC (57) ABSTRACT

An amplifier receives an optical signal including a number of labeled channels via a fiber. The amplifier determines a count of the labeled channels and a spectral distribution of the labeled channels. The amplifier adjusts a parameter of the amplifier based on the count of the labeled channels and the spectral distribution of the labeled channels. The amplifier amplifies the optical signal at an adjusted output gain resulting from adjusting the parameter of the amplifier.

6 Claims, 5 Drawing Sheets

(56) References Cited

U.S. PATENT DOCUMENTS

| | | | |
|---|---|---|---|
| 8,032,022 B2 | 10/2011 | Feuer et al. | |
| 2004/0218920 A1 | 11/2004 | Piotte et al. | |
| 2007/0110452 A1 | 5/2007 | Uda et al. | |
| 2008/0267631 A1* | 10/2008 | Collings | H04J 14/0205 398/97 |
| 2011/0110657 A1 | 5/2011 | Feuer et al. | |
| 2012/0014695 A1 | 1/2012 | Feuer et al. | |

OTHER PUBLICATIONS

Vinay A. Vaishampayan and Mark D. Feuer, "An Overlay Architecture for Managing Lightpaths in Optically Routed Networks," IEEE Transactions on Communications, Oct. 2005, pp. 1729-1737, vol. 53, No. 10.

Mark D. Feuer and Vinay A. Vaishampayan, "Clip-on Fiber Identifier Using Digital Lightpath Labels", Asia Communications and Photonics Conference, 2009, 5 pages, Shanghai, China.

Mark D. Feuer and Vinay A. Vaishampayan, "Rejection of Interlabel Crosstalk in a Digital Lightpath Labeling System with Low-Cost All Wavelength Receivers", Journal of Lightware Technology, Mar. 2006, pp. 1121-1128, vol. 24, No. 3.

"Fiber-Optic Communication", downloaded from http://en.wikipedia.org/wiki/Fiber-optic_communication, Sep. 26, 2012, 12 pages.

\* cited by examiner

FAST OPTICAL LINK CONTROL ADAPTATION USING A CHANNEL MONITOR

This application is a continuation of U.S. patent application Ser. No. 13/675,454 filed Nov. 13, 2012, the disclosure of which is herein incorporated by reference in its entirety.

TECHNICAL FIELD

This application relates generally to systems, methods and apparatus for fast optical link control adaptation using a channel monitor and more particularly to systems, methods and apparatus for fast optical link control adaptation using a channel monitor employing a channel labeling system.

BACKGROUND

Optical communication systems transmit and receive channels over optical fiber. When transmitting channels from node to node, if the distance between nodes is significant, the channels may need to be amplified. Amplifiers placed in between nodes provide amplification of channels. The amplifiers may be placed between the source node and the destination node at certain intervals (e.g., 80 kilometers).

In optical communication systems, reconfigurable optical add-drop multiplexers (ROADMs) may be used to add and drop channels along the way. For example, when a particular channel reaches its intended destination, a ROADM may drop the channel from the system.

When a problem occurs in optical communication systems, channels may be lost. Other channel transmission may be affected by the lost channels in the optical communication systems.

SUMMARY

In accordance with an embodiment, an amplifier receives an optical signal including a number of labeled channels. The optical signal is carried on a fiber. The amplifier determines a count of the labeled channels and a spectral distribution of the labeled channels. A parameter of the amplifier is adjusted based on the count of the labeled channels and the spectral distribution of the labeled channels. The optical signal is amplified at an adjusted output gain resulting from adjusting the parameter of the amplifier.

In an embodiment, a system includes an amplifier. The amplifier includes a channel monitor that receives optical signal including a number of labeled channels. The channel monitor determines a count of the labeled channels and a spectral distribution of the labeled channels. The amplifier includes a pump laser source to amplify the optical signal. The amplifier also includes an amplifier controller to adjust a parameter of the pump laser source based on the count of the labeled channels and the spectral distribution of the labeled channels to control amplification of the optical signal at an adjusted output gain.

In an embodiment, an amplifier includes a processor and a memory communicatively coupled to the processor. The memory to stores computer program instructions. When the computer program instructions are executed on the processor, the computer program instructions cause the processor to perform operations comprising: receiving, at an amplifier, an optical signal including a number of labeled channels, the optical signal carried on a fiber; determining a count of the labeled channels and a spectral distribution of the labeled channels; adjusting a parameter of the amplifier based on the count of the labeled channels and the spectral distribution of the labeled channels; and amplifying the optical signal at an adjusted output gain resulting from adjusting the parameter of the amplifier.

In an embodiment, a computer readable medium storing computer program instructions for providing optical link control adaptation, which, when executed on a processor, cause the processor to perform the following operations: receiving, at an amplifier, an optical signal including a number of labeled channels, the optical signal carried on a fiber; determining a count of the labeled channels and a spectral distribution of the labeled channels; adjusting a parameter of the amplifier based on the count of the labeled channels and the spectral distribution of the labeled channels; and amplifying the optical signal at an adjusted output gain resulting from adjusting the parameter of the amplifier.

These and other advantages of the present disclosure will be apparent to those of ordinary skill in the art by reference to the following Detailed Description and the accompanying drawings.

DETAILED DESCRIPTION

Figure 1:
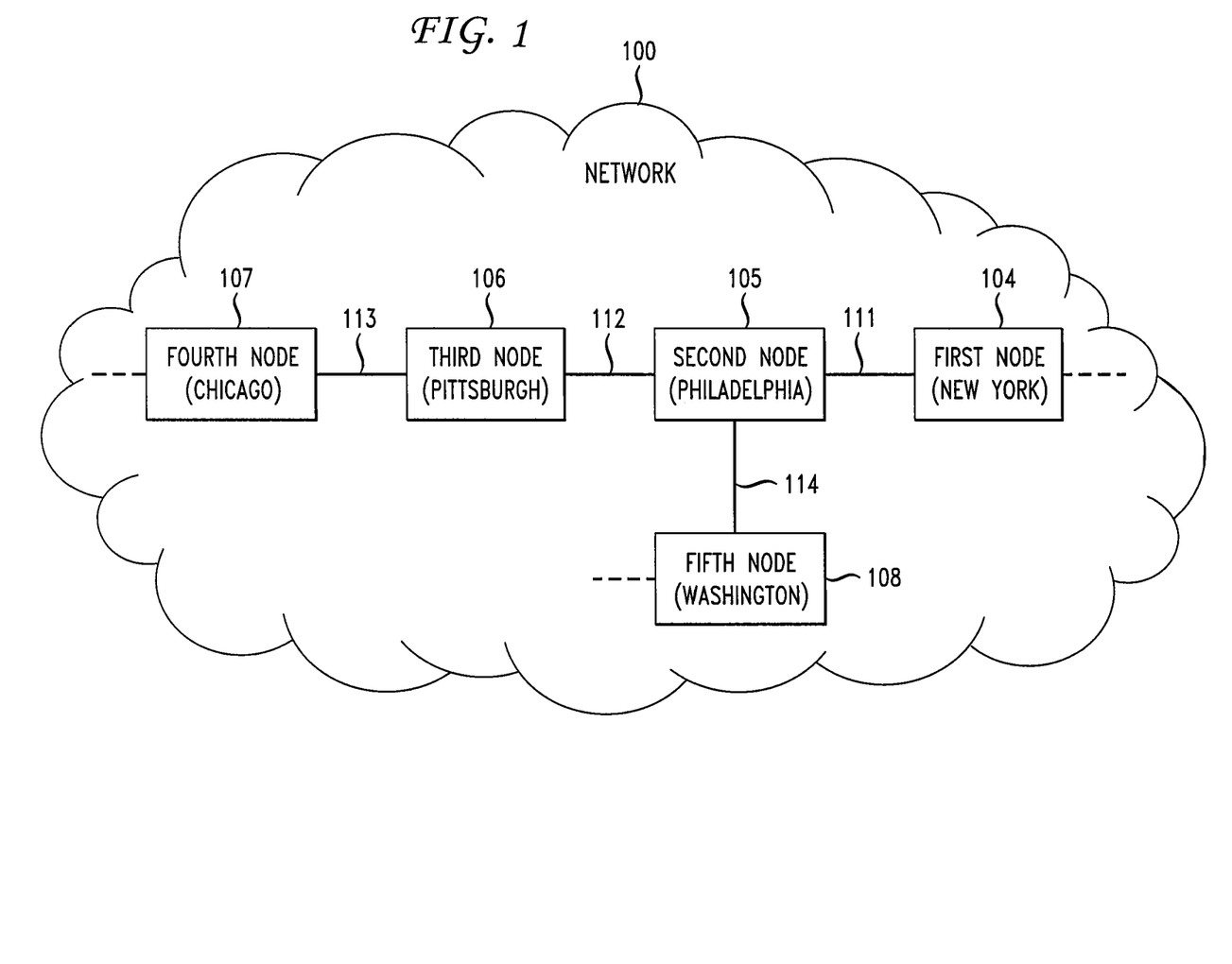
FIG. 1 depicts a communication network, in accordance with an embodiment of the present application.

FIG. 1 depicts a communication network, in accordance with an embodiment of the present application. FIG. 1 includes a section of a mesh communication network 100, comprising multiple nodes. A first node 104 is located in New York; a second node 105 is located in Philadelphia; a third node 106 is located in Pittsburgh, a fourth node 107 is located in Chicago and a fifth node 108 is located in Washington, D.C. Each of the nodes can communicate with any other node by sending signals through an optical fiber 111, an optical fiber 112, and optical fiber 113, and/or an optical fiber 114 interconnecting the nodes. Each optical fiber may simultaneously carry many independent signals, including signals from different sources and/or signals intended for different destinations, by assigning each independent signal a unique wavelength channel. Such a scheme is called wavelength-division multiplexing (WDM).

Suppose now that an operator, system, etc. wishes to transmit data from first node 104, located in New York, to fourth node 107, located in Chicago. The data may be transmitted from first node 104 to fourth node 107 in the following manner. First node 104 may transmit the data over a channel of an optical fiber to second node 105, located in Philadelphia. Second node 105 may then transmit the channel containing the data to third node 106, located in Pittsburgh. Third node 106 may then transmit the channel containing the data to fourth node 107, located in Chicago, which is the destination node. At the same time, data may be transmitted from the fifth node 108, located in Washington, to the fourth node 107, located in Chicago, passing through the same intermediary nodes and the same fibers as the New York-Chicago data, by utilizing a different wavelength channel. In another embodiment, first node 104 may transmit the data to fourth node 107 in a different way than the one described above.

In an embodiment, data is transmitted on one or more channels. A channel is an optical signal transmitted at a particular wavelength. The data may be carried on a fiber as a multiplexed optical signal, where wavelength-division multiplexing (WDM) is used to multiplex multiple channels onto the multiplexed optical signal.

Figure 2:
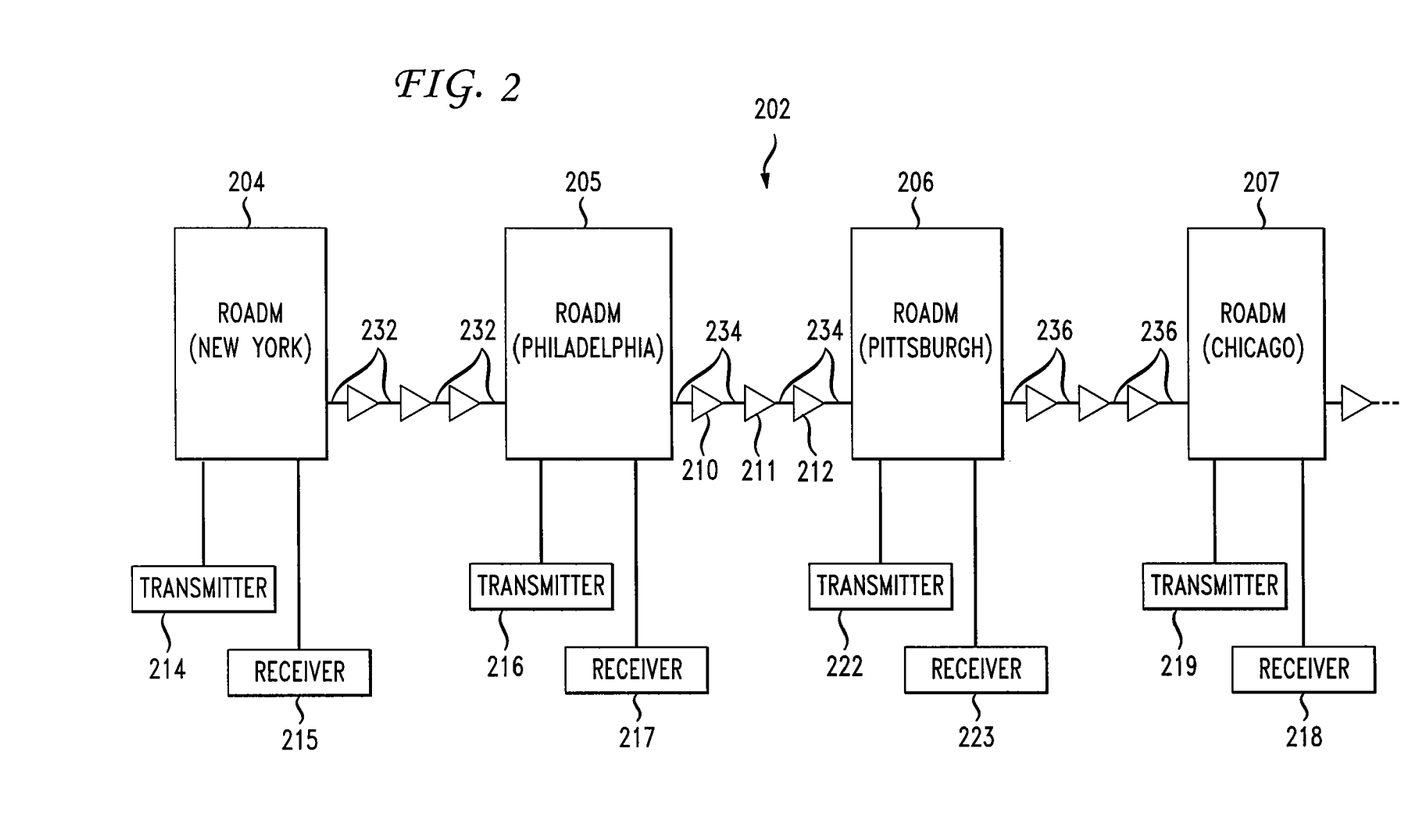
FIG. 2 depicts a ROADM communication system, in accordance with an embodiment of the present application.

FIG. 2 depicts a reconfigurable optical add-drop multiplexer (ROADM) communication system, in accordance with an embodiment of the present application. A ROADM communication system 202 includes a ROADM 204 located in New York, a ROADM 205 located in Philadelphia, a ROADM 206 located in Pittsburgh and a ROADM 207 located in Chicago. If a channel originating in New York at ROADM 204 is to be transmitted to ROADM 207 at Chicago, the channel may then be transmitted to ROADM 207 via one or more intermediary ROADMs. For example, the intermediary ROADMs may be ROADM 205 located in Philadelphia and ROADM 206 located in Pittsburgh.

Each ROADM can add and/or drop optical signals and/or channels carried on a multiplexed optical signal. Data transmitted between the ROADMs may be carried on fiber. Data transmitted between ROADM 204 and ROADM 205 is carried on fiber 232. Data transmitted between ROADM 205 and ROADM 206 is carried on fiber 234. Data transmitted between ROADM 206 and ROADM 207 is carried on fiber 236. In an embodiment, multiple fibers may be used to carry the data. In an embodiment, a multiplexed optical signal including multiple channels may be carried on fiber using wavelength-division multiplexing (WDM).

In order to transmit multiplexed optical signals between each pair of sequential ROADMs (ROADM 204, ROADM 205, ROADM 206, and ROADM 207), the multiplexed optical signals may require amplification, as the distance between each pair of ROADMs is significantly large (e.g., greater than 80 kilometers). The amplification may be provided by one or more amplifiers, represented in FIG. 2 as triangles. The amplifiers may be placed at certain distances from each other and the ROADMs. For example, each amplifier may be located within 80 kilometers of each other or of another ROADM. Therefore, the channel may be amplified every 80 kilometers. In an embodiment, the amplifiers may be inline amplifiers.

FIG. 2 depicts amplifier 210, amplifier 211 and amplifier 212 which are located between ROADM 205, located in Philadelphia, and ROADM 206, located in Pittsburgh. In an exemplary embodiment, the distance between amplifiers 210 and 211, the distance between amplifier 211 and 212, the distance between ROADM 205 and amplifier 210 and the distance between amplifier 212 and ROADM 206 may be equivalent to 80 kilometers.

In an embodiment, each ROADM may be connected to one or more transmitters and receivers. At a ROADM, a channel may be added or dropped from the multiplexed optical signal. When a new channel is to be added at a source ROADM, the channel from a transmitter may be multiplexed onto the multiplexed optical signal at the source ROADM. When the channel reaches a destination ROADM, the channel is demultiplexed (e.g., dropped) at the destination ROADM (e.g., to the receiver). The demultiplexed channel is then used to retrieve the information transmitted on that channel.

ROADM 205 is connected to a transmitter 216 and a receiver 217. ROADM 206 is connected to a transmitter 222 and a receiver 223. The ROADMs depicted in FIG. 2 may correspond to the nodes depicted in FIG. 1. For example, ROADM 204, connected to a transmitter 214 and a receiver 215 may correspond to first node 104, in FIG. 1. Similarly, ROADM 207, connected to a receiver 218 and a transmitter 219, may correspond to fourth node 107, in FIG. 1. In the embodiment depicted by FIG. 2, each ROADM is connected to at least one transmitter and at least one receiver. In an embodiment, a transmitter and a receiver may be internal to a ROADM or a ROADM may have no direct connections to receivers or transmitters.

Although FIG. 2 depicts ROADMs, fixed optical add-drop multiplexers (OADMs) may also be used.

Suppose that first data is to be transmitted on a first channel from New York to Chicago and second data is to be transmitted on a second channel from Philadelphia to Chicago. The first channel including the first data is added to the multiplexed optical signal on fiber 232 by transmitter 214 at ROADM 204 to be received from fiber 236 by receiver 218 at ROADM 207. The second channel including the second data is multiplexed onto the multiplexed optical signal on fiber 234 by transmitter 216 at ROADM 205 received on fiber 236 by receiver 218 at ROADM 205. Suppose now that a problem occurs in ROADM communication system 202. The problem may include one or more of the amplifiers failing, a fiber cut, a transmitter failure, etc. Some of the channels may continue to be transmitted across the communication system, while other channels may be affected by the problem. For example, if a fiber cut occurs between ROADM 204 and ROADM 205, a failure in the transmission (and reception) of the first channel will occur. The first channel may be lost, causing a sudden reduction by a factor of two (i.e., −3 dB) in the total optical power entering the first amplifier between Philadelphia and Chicago, amplifier 210. Amplifier 210 may respond to the sudden drop in total input power by increasing gain, triggering a sudden increase in the optical power output in the surviving optical channel wavelength. The resulting power transient may propagate down the chain of amplifiers to Chicago, ultimately overloading the receiver and causing errors or outages in the recovered data stream. Since a WDM system may carry as many as 96 wavelength channels, a fiber cut can easily reduce the input power to an amplifier by more than 10 dB, causing very severe power transients in the surviving channels. In a case when there are multiple surviving channels, the magnitude of the amplifier gain transient may vary with wavelength, causing an imbalance among the formerly balanced channel powers. This power imbalance depends not only on the number of channels lost but also on each of the channel's position in the spectrum (i.e., the imbalance may shift depending on which specific wavelengths were lost and which specific wavelength channels are surviving). Therefore, the channel imbalance cannot be corrected by only measuring the surviving power or by only measuring the number of channels lost.

One solution to the above problem is to inject "reservoir" channels at the first ROADM following a fiber cut to compensate for the missing power and location of the lost channels. However, this approach may be expensive and complicated, involving extra light sources and fast attenuator hardware. Setting channels aside for reservoir service also reduces the number of data channels carried by the system. Therefore, injecting of reservoir channels may be increase cost and reduce data throughput.

According to an advantageous embodiment, amplifiers perform an output power adjustment based on the number of channels present as well as their location in the optical spectrum. When a problem occurs (e.g., during a fiber cut), some channels are lost and the amplifier can be adjusted very quickly for the new number of channels and their location in the optical spectrum. Embodiments of the present disclosure provide an easier and more cost effective solution in which each amplifier can be controlled using localized control loops to set to the optimum operating point for that amplifier within a few microseconds. Each amplifier may make a smarter decision having localized knowledge without requiring extra light sources or setting aside reservoir channels.

Thus, in order to deal with a problem occurring in the ROADM communication system, one or more of the amplifiers may need to determine which channels are surviving and the location of those channels in the optical spectrum. The amplifiers may then determine that adjustment of pump power, gain, and/or tilt is required. Details regarding the amplifiers determining which channels remain and the location of the channels in the spectrum are described herein.

In various embodiments, any type of amplifiers may be used. For example, Erbium-doped-fiber amplifiers (EDFAs), Raman amplifiers, and semiconductor optical amplifiers or other types of amplifiers can be used to amplify the channel.

Figure 3:
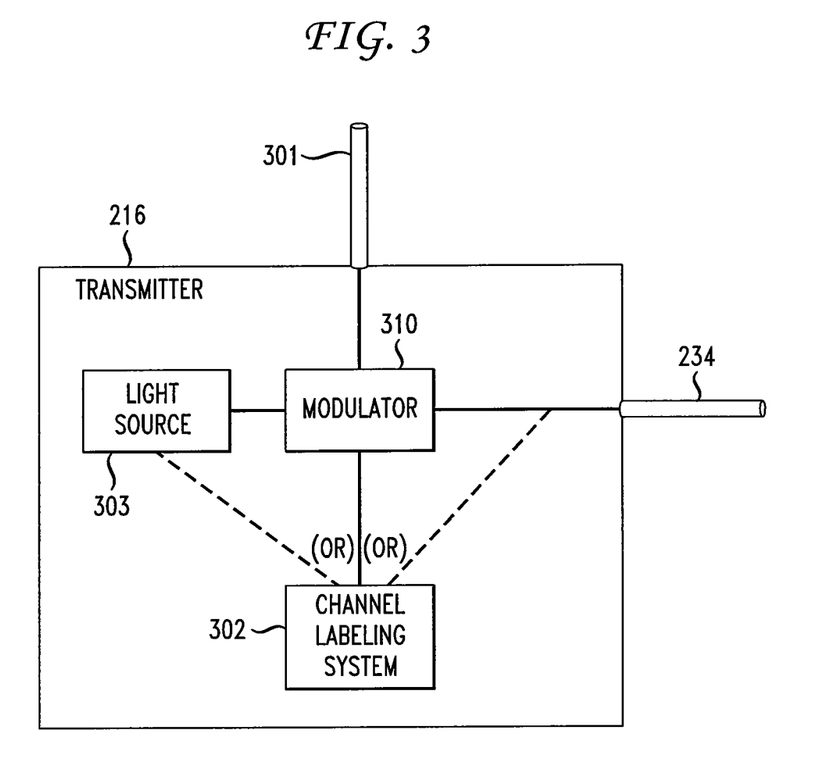
FIG. 3 depicts details regarding an exemplary transmitter, in accordance with an embodiment of the present application.

FIG. 3 depicts details regarding an exemplary transmitter, in accordance with an embodiment of the present application. In the depicted embodiment, details regarding transmitter 216 are shown. However, any transmitter (e.g., transmitter 214, etc.) may include similar details as transmitter 216. Transmitter 216 includes a light source 303, a modulator 310, and a channel labeling system 302. A data signal that is carried on fiber 301 may be input into transmitter 216. Alternatively, the input data might arrive on multiple fibers or on one or more electrical conductors. The data signal is transmitted to modulator 310 of channel transmitter 216. The modulator 310 may be coupled to a light source 303. The light source 303 may be a laser, such as a semiconductor laser. The modulator 310 modulates the data signal onto an optical carrier wave emitted from the light source 303 to create a channel.

In order to label the channel at a source (e.g. at transmitter 216), channel labeling system 302 assigns a channel label to the outgoing optical signal. The label may be unique throughout the network, or the same label may be reused at another location in the network. However, the label must be arranged such that that the same label is never used for two different channels carried in the same fiber. A simple way to guarantee that the same label is not used for two different channels carried in the same fiber is to use one label per wavelength. Since no two channels in a single fiber can be allowed to share the same wavelength, no two channels in a single fiber will share the same label. Channel labeling system 302 may assign its label autonomously, or may receive label assignments from a label controller outside the transmitter 216. The labeled optical signal may be carried onto output fiber 234. In an embodiment, the label may be inserted into the header of the payload of the channel. In another embodiment, channel labeling system 302 encodes and reshuffles the incoming bit stream in a digital encoding process in order to provide a channel label that can be read by an inexpensive, low speed label receiver capable of reading labels from multiple channels simultaneously. Additional information regarding a channel labeling system can be found in M. D. Feuer and V. A. Vaishampayan, "Rejection of interlabel crosstalk in a digital lightpath labeling system with low-cost all-wavelength receivers", IEEE J. Lightwave Technol., vol. 24, pp. 1121-1128 (2006). A few extra bits may be added into the channel data stream, representing coding overhead of ~1%. Alternate techniques for creating the channel labels may include shifting the carrier frequency, amplitude, polarization, or other characteristic of the light source 303 before the light reaches the data modulator 310. In yet another embodiment, the optical signal emerging from the data modulator 310 may be overmodulated before being transmitted to the output fiber. (See Y. Hamazumi and M. Koga, "Transmission capacity of optical path overhead transfer scheme using pilot tone for optical path network," IEEE J. Lightwave Technol., vol. 15, pp. 2197-2205 (1997)). When this overmodulation uses a single frequency sinusoidal wave, the method is sometimes referred to as "pilot tones". In one embodiment, the channel labeling system 302 may create an auxiliary data transmission channel, in which the label is sent as a message. In an embodiment, a low speed label receiver may receive the message simultaneously with label messages on other wavelengths in the fiber, contributing to rapid readout of a count and spectral distribution of the channels entering an optical amplifier. Additional details regarding the labeling of an optical signal and/or channel are described in U.S. Pat. No. 7,580,632 by Feuer et al., which is incorporated herein by reference in its entirety.

Transmitter 216 may include additional components (not shown).

Figure 4:
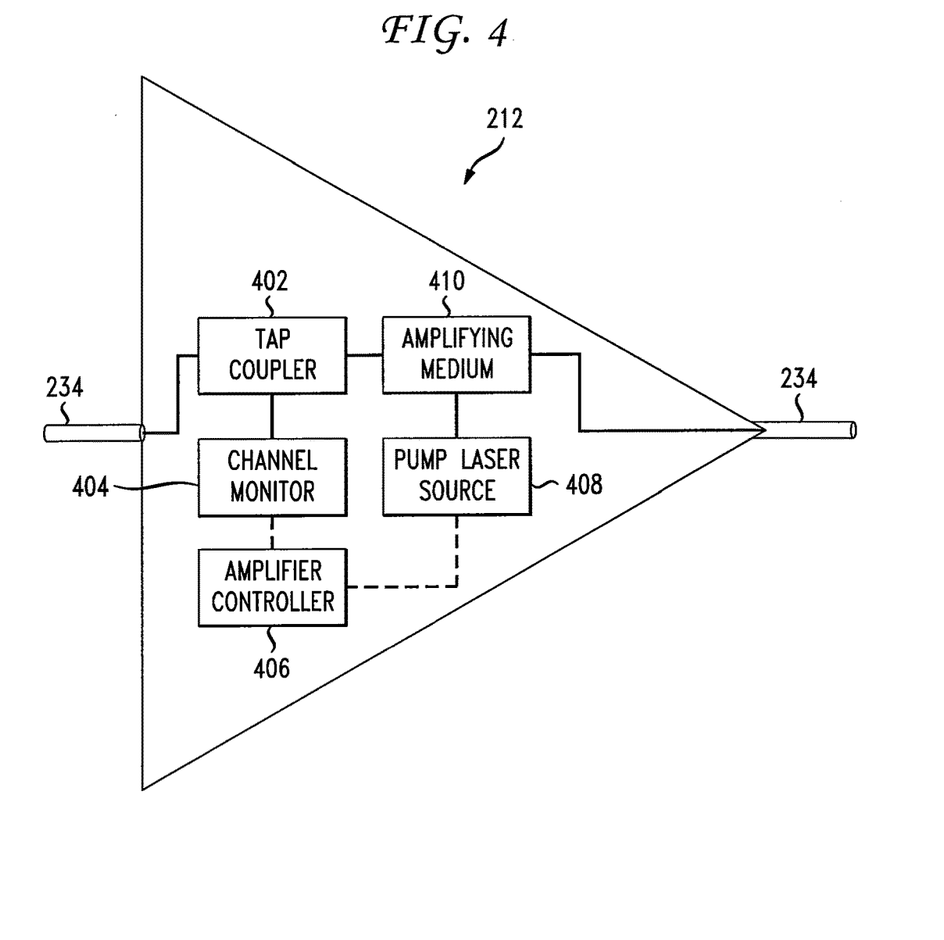
FIG. 4 depicts details regarding an exemplary amplifier, in accordance with an embodiment of the present application.

FIG. 4 depicts details regarding an exemplary amplifier, in accordance with an embodiment of the present application. Amplifier 212 includes a tap coupler 402, a channel monitor 404, an amplification medium 410, an amplifier controller 406, and a pump laser source 408. As a multiplexed optical signal carried on fiber 234 is received by amplifier 212, the optical signal is input to splitter 402. Tap coupler 402 may split the multiplexed optical signal unto two output paths in order to input the optical signal to channel monitor 404 and to amplification medium 410. Channel monitor 404 receives the multiplexed optical signal and monitors/reads the labels associated with the channels on the multiplexed optical signal. For example, the labels may provide an identifier associated with each channel, which allows amplifier 212 to determine details regarding each channel in order to determine the number of channels present and identify which channels are present. In an embodiment, channel monitor 404 may also measure the optical power present in each channel as well as their number and arrangement. Amplifier controller 406 calculates how much the pump power must be adjusted based on channel information (e.g., how many/which channels remain) from channel monitor 404 and adjusts those parameters of pump laser source 408. In an embodiment, pump laser source 408 may include one or multiple pump lasers. If pump laser source 408 includes more than one pump laser, the amplifier controller 406 may adjust each pump power for each pump laser separately. Pump laser source 408 provides energy for the amplifying medium 410, enabling amplifying medium 410 to amplify the multiplexed optical signal. Amplifier controller 406 controls pump laser source 408 by adjusting the parameter (e.g. pump power of each pump laser) of pump laser source 408 such that the multiplexed optical signal is amplified at an output power that is appropriate for the number and the spectral distribution of the remaining channels. The adjusted channel is then carried on a fiber onto the next amplifier, ROADM, destination, etc. In an embodiment, amplifier controller 406 may also control a variable optical attenuator (not shown) that may be a part of the amplifier 212 in order to attain the needed output power and gain tilt. In another embodiment, the amplifier controller may also control a variable gain tilt element (not shown) included as part of the amplifier 212 in order to attain the same goals. When the amplifier 212 includes multiple sections of amplifying medium, the amplifier controller may control pump power to any or all of the multiple amplifying medium sections.

In an embodiment of the present application, the optical amplifiers are individually able to determine details regarding incoming channels and, in turn, can adjust power, gain, and/or tilt. In order for amplifier 212 in FIG. 4 to perform adjustments (e.g., adjust power) of the channels when a problem occurs in the optical communication network, amplifier 212 needs to determine the wavelengths associated with each incoming channels and a number of incoming channels. Amplifier 212 can determine the wavelengths and a number of channels using channel monitor 404. Channel monitor 404 reads a label assigned to each incoming channel (e.g., assigned by a source transmitting the channel). Therefore, amplifier 212 is provided a clear knowledge of the number of channels and where they are located in the spectrum in order to setup each amplifier with only a local control loop that adjusts each amplifier by itself to the optimum settings.

Figure 5:
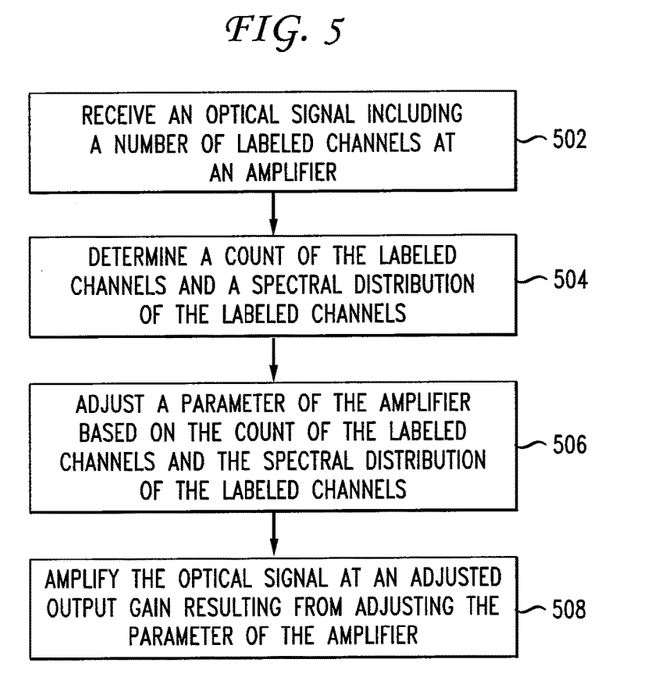
FIG. 5 is a flowchart of adjusting power in an optical system, in accordance with an embodiment of the present application.

FIG. 5 is a flowchart of adjusting power in an optical system, in accordance with an embodiment of the present application. One or more optical signals having particular wavelengths make up one or more channels. One or more channels are transmitted from a source (e.g., transmitter 216) to a destination (e.g., receiver 218). The channels pass through one or more amplifiers, including amplifier 212.

At step 502, an optical signal including a number of labeled channels is received at an amplifier. The optical signal is carried on a fiber. For example, a multiplexed optical signal including a number of labeled channels is received at channel monitor 404 of amplifier 212. The multiplexed optical signal is carried on fiber 234 and each channel is labeled by channel labeling system 302 at a transmitter (e.g., at a source) which added the channels to the multiplexed optical signal. In an embodiment, the number of labeled channels may include one channel or multiple channels.

Prior to amplifier 212 receiving the multiplexed optical signal, each of the multiple labeled channels is labeled by a channel labeling system. The labels include information regarding each respective channel, including the wavelength of the channel.

At step 504, a count of the labeled channels and a spectral distribution of the labeled channels is determined. Channel monitor 404 in amplifier 212 determines a count (e.g., a number) of the labeled channels and a spectral distribution of the labeled channels in the multiplexed optical signal. Each labeled channel includes a tag and/or a label that can be read by amplifier 216 (and channel monitor 404) in a low cost fashion. Channel monitor 404 reads the label of the labeled channels in order to determine a number and a spectral distribution of the labeled channels. The spectral distribution may include a frequency. The spectral distribution may also include the optical power level of an individual channel.

When channel monitor 404 receives the multiplexed optical signal, channel monitor 404 may decode a portion of a channel transmitted on the multiplexed optical signal to identify the channel and the channel's location in an optical spectrum. If multiple channels are received by channel monitor 404, channel monitor 404 decodes each label associated with each of the labeled channels to determine a respective unique identifier associated with respective wavelengths corresponding to each of the multiple labeled channels. The unique identifier is coded into the channel by the source of the channel (e.g., channel labeling system 302).

Suppose that a loss of one of the labeled channels is detected. Specifically, channel monitor 404 in amplifier 212 detects a loss of one of the labeled channels. The loss may result from an amplifier failing along the transmission, a fiber cut between ROADMs or as a result of other failures and/or problems. In an embodiment, as a result of a problem, some labeled channels may disappear and channel monitor 404 is able to detect the disappearance. In an embodiment, the loss of one (or more) of the labeled channels results in an optical transient. That is, a temporary fast change of state of the channel occurs (e.g., oscillation results in a sudden rise in power followed by a sudden drop in power) and the loading of amplifiers is affected.

Suppose that the fiber cut occurs between ROADM 204 located in New York and ROADM 205 located in Philadelphia. Prior to the fiber cut, ROADM 205 may have been transmitting channels at 80 wavelengths and after the fiber cut, the number is reduced to 30 wavelengths. The remaining channels experience a temporary fluctuation in gain due to the fiber cut. ROADM 205 must continue to transmit the remaining channels (e.g., at the 30 wavelengths), which are not lost, onto ROADM 206, ROADM 207, etc.

In an embodiment, if the transient continues, other remaining labeled channels may experience channel loading and the other remaining labeled channels may lose power. This may lead to an outage of the other remaining labeled channels. However, the present application performs adjustments in order to cope with the lost channels.

Channel monitor 404 determines a remainder of the labeled channels (e.g., by reading the tag and/or label of the labeled channels). In order to deal with the loss of one or more labeled channels, amplifier 212 needs to be adjusted very quickly for the new number of labeled channels and the location of the labeled channels in the spectrum.

As described above, channel monitor 404 determines, for each of the labeled channels, a location in a spectrum associated with each of the remainder of the labeled channels. Channel monitor 404 determines exactly how many channels are present and where these channels are located in the spectrum by reading the label included in each channel.

As described above, the channel is coded with the label by a source that transmits the channel. Suppose that the channel originates from New York. Transmitter 214 may code the channel with the label. Channel monitor 404 decodes the data to determine the label and thus, channel monitor 404 determines the location in the optical spectrum of the channel(s).

At step 506, a parameter of the amplifier is adjusted based on the count of the labeled channels and the spectral distribution of the labeled channels. For example, amplifier controller 406 adjusts a parameter of pump laser source 408 of amplifier 212 based on the count and the spectral distribution of the labeled channels in the multiplexed optical signal. For example, if the original load of 80 wavelengths is reduced to a cohort of 30 surviving channels, the amplifying medium 410 does not require as much energy in order to amplify the new, lower channel load. So the pump laser source may be directed to reduce its pump powers to ~40% of its pump power under full load. If pump power adjustment does not control output power and gain with adequate accuracy, the amplifier controller may also direct adjustments of a variable optical attenuator and/or a gain-tilt element, in combination with, e.g., a reduction of the pump power to 70% of its original value.

At step 508, the optical signal is amplified at an adjusted output gain resulting from adjusting the parameter of the amplifier. Amplifier controller 406 adjusts the parameter of pump laser source 408. Adjusting the parameter pump laser source 408 results in amplification of the multiplexed optical signal at an adjusted output gain. Thus, amplifier 212 can locally make fast adjustments to the power for amplifying the optical signal based on the current number and the current spectral distribution of channels in the optical signal at the amplifier, which may be beneficial over a centralized control loop.

The amplified optical signal (at the adjusted output gain) is then transmitted from amplifier 212, on fiber 234 to a next amplifier, ROADM, receiver, destination, etc.

In the present application, it is desirable to have each amplifier react optimally to the lost channels. Localized amplifiers may not have the knowledge of the number and location of each channel. In the present application, the amplifier is provided a way to very quickly and cheaply sense how many channels are present and each channels location in the optical spectrum. Additionally, an amplifier may detect total power of the amplifier to adjust the pump laser source inside the amplifier quickly, reacting optimally to the transient.

In an embodiment, instead of using expensive and complex additional hardware, the present application gives each local amplifier a clear knowledge of the amount of channels and where they are located in the spectrum to setup each amplifier with only a local control loop that adjusts each amplifier by itself to the optimum settings.

In various embodiments, the method steps described herein, including the method steps described in FIG. 5, may be performed in an order different from the particular order described or shown. In other embodiments, other steps may be provided, or steps may be eliminated, from the described methods.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the method steps described herein, including one or more of the steps of FIG. 5. Certain steps of the methods described herein, including one or more of the steps of FIG. 5, may be performed by a server or by another processor in a network-based cloud-computing system. Certain steps of the methods described herein, including one or more of the steps of FIG. 5, may be performed by a client computer in a network-based cloud computing system. The steps of the methods described herein, including one or more of the steps of FIG. 5, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIG. 5, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 6:
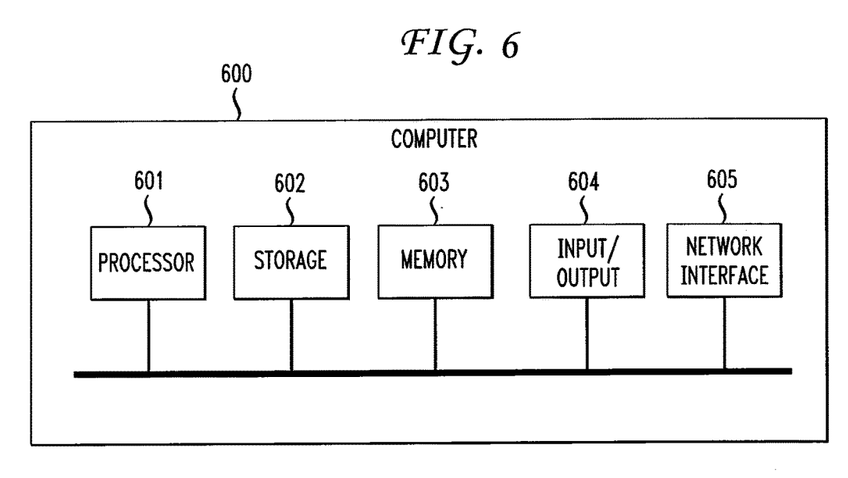
FIG. 6 shows components of a computer that may be used to implement the application.

A high-level block diagram of an exemplary computer that may be used to implement systems, apparatus and methods described herein is illustrated in FIG. 6. Computer 600 includes a processor 601 operatively coupled to a data storage device 602 and a memory 603. Processor 601 controls the overall operation of computer 600 by executing computer program instructions that define such operations. The computer program instructions may be stored in data storage device 602, or other computer readable medium, and loaded into memory 603 when execution of the computer program instructions is desired. Thus, the method steps of FIG. 5 can be defined by the computer program instructions stored in memory 603 and/or data storage device 602 and controlled by the processor 601 executing the computer program instructions. For example, the computer program instructions can be implemented as computer executable code programmed by one skilled in the art to perform an algorithm defined by the method steps of FIG. 5. Accordingly, by executing the computer program instructions, the processor 601 executes an algorithm defined by the method steps of FIG. 5. Computer 600 also includes one or more network interfaces 604 for communicating with other devices via a network. Computer 600 also includes one or more input/output devices 605 that enable user interaction with computer 600 (e.g., display, keyboard, mouse, speakers, buttons, etc.).

Processor 601 may include both general and special purpose microprocessors, and may be the sole processor or one of multiple processors of computer 600. Processor 601 may include one or more central processing units (CPUs), for example. Processor 601, data storage device 602, and/or memory 603 may include, be supplemented by, or incorporated in, one or more application-specific integrated circuits (ASICs) and/or one or more field programmable gate lists (FPGAs).

Data storage device 602 and memory 603 each include a tangible non-transitory computer readable storage medium. Data storage device 602, and memory 603, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 605 may include peripherals, such as a printer, scanner, display screen, etc. For example, input/output devices 605 may include a display device such as an organic light-emitting diode (OLED) display, an electrophoretic ink (E Ink) display, a cathode ray tube (CRT) or liquid crystal display (LCD) monitor for displaying information to the user, a keyboard, and a pointing device such as a mouse or a trackball by which the user can provide input to computer 600.

Any or all of the systems and apparatus discussed herein, including first node 104, second node 105, third node 106, fourth node 107, fifth node 108, ROADM 204, ROADM 205, ROADM 206, ROADM 207, transmitter 214, receiver 215, transmitter 216, receiver 217, receiver 218, transmitter 219, transmitter 222, receiver 223, amplifier 210, amplifier 211, amplifier 212, channel labeling system 302, modulator 310, light source 303, tap coupler 402, channel monitor 404, pump laser source 408, amplifying medium 410 and amplifier controller 406, may be implemented using a computer such as computer 600.

One skilled in the art will recognize that an implementation of an actual computer or computer system may have other structures and may contain other components as well, and that FIG. 8 is a high level representation of some of the components of such a computer for illustrative purposes.

The foregoing Detailed Description is to be understood as being in every respect illustrative and exemplary, but not restrictive, and the scope of the disclosure disclosed herein is not to be determined from the Detailed Description, but rather from the claims as interpreted according to the full breadth permitted by the patent laws. It is to be understood that the embodiments shown and described herein are only illustrative of the principles of the present application and that various modifications may be implemented by those skilled in the art without departing from the scope and spirit of the application. Those skilled in the art could implement various other feature combinations without departing from the scope and spirit of the application.

The invention claimed is:

1. A method comprising:
   detecting, at an amplifier, a change in a received optical signal resulting in a reduced number of labeled channels being received;
   decoding each label of the reduced number of labeled channels to determine a respective unique identifier associated with a respective wavelength corresponding to each of the reduced number of labeled channels;
   determining a count of the reduced number of labeled channels based on the decoding;
   determining an optical power of each of the reduced number of labeled channels;
   determining a spectral distribution of the reduced number of labeled channels based on the decoding and the determining the optical power of each of the reduced number of labeled channels;
   adjusting a variable optical attenuator of the amplifier and a variable tilt element of the amplifier based on the count of the reduced number of labeled channels and the spectral distribution of the reduced number of labeled channels; and
   amplifying the received optical signal to an output power and gain tilt based on the adjusting.

2. The method of claim 1, wherein the change in the received optical signal is due to a problem with a fiber used to transmit the received optical signal to the amplifier.

3. An apparatus comprising:
   a processor; and
   a memory to store computer program instructions, the computer program instructions when executed by the processor cause the processor to perform operations comprising:
   detecting a change in a received optical signal resulting in a reduced number of labeled channels being received;
   decoding each label of the reduced number of labeled channels to determine a respective unique identifier associated with a respective wavelength corresponding to each of the reduced number of labeled channels;
   determining a count of the reduced number of labeled channels based on the decoding;
   determining an optical power of each of the reduced number of labeled channels;
   determining a spectral distribution of the reduced number of labeled channels based on the decoding and the determining the optical power of each of the reduced number of labeled channels;
   adjusting a variable optical attenuator of an amplifier and a variable tilt element of the amplifier based on the count of the reduced number of labeled channels and the spectral distribution of the reduced number of labeled channels; and
   amplifying the received optical signal to an output power and gain tilt based on the adjusting.

4. The apparatus of claim 3, wherein the change in the received optical signal is due to a problem with a fiber used to transmit the received optical signal to the amplifier.

5. A non-transitory computer readable medium storing computer program instructions, which, when executed by a processor, cause the processor to perform operations comprising:
   detecting a change in a received optical signal resulting in a reduced number of labeled channels being received;
   decoding each label of the reduced number of labeled channels to determine a respective unique identifier associated with a respective wavelength corresponding to each of the reduced number of labeled channels;
   determining a count of the reduced number of labeled channels based on the decoding;
   determining an optical power of each of the reduced number of labeled channels;
   determining a spectral distribution of the reduced number of labeled channels based on the decoding and the determining the optical power of each of the reduced number of labeled channels;

adjusting a variable optical attenuator of an amplifier and a variable tilt element of the amplifier based on the count of the reduced number of labeled channels and the spectral distribution of the reduced number of labeled channels; and amplifying the received optical signal to an output power and gain tilt based on the adjusting.

6. The non-transitory computer readable medium of claim 5, wherein the change in the received optical signal is due to a problem with a fiber used to transmit the received optical signal to the amplifier.

\* \* \* \* \*